Dec. 23, 1969  K. H. SENNOWITZ  3,485,992
MULTIPLE ELECTRODE SERVO FEED CONTROL CIRCUIT FOR
ELECTRICAL DISCHARGE MACHINING APPARATUS
Filed Jan. 22, 1968
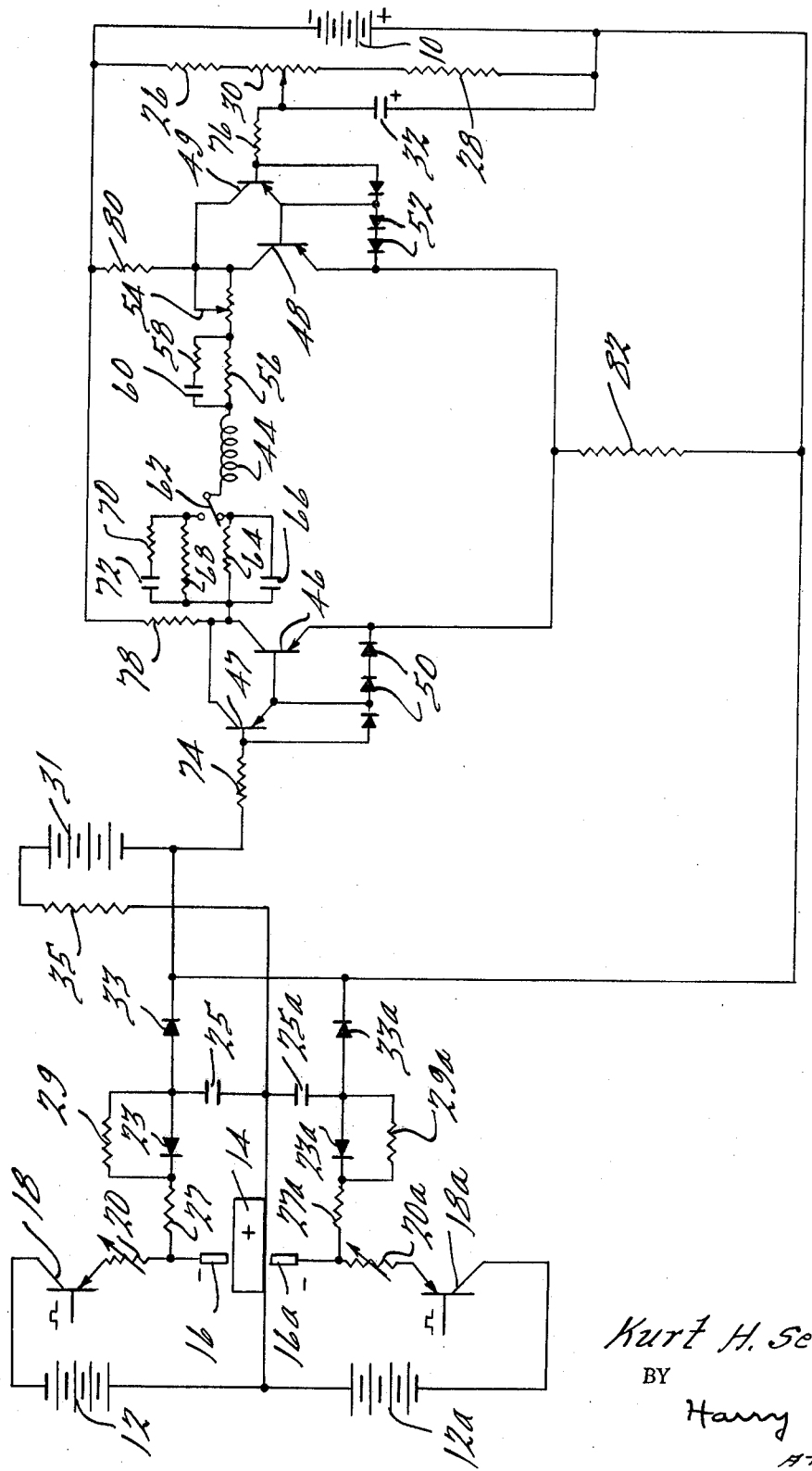
INVENTOR.
*Kurt H. Sennowitz.*
BY
*Harry R Dumont*
ATTORNEY.

United States Patent Office 3,485,992
Patented Dec. 23, 1969

3,485,992
MULTIPLE ELECTRODE SERVO FEED CONTROL CIRCUIT FOR ELECTRICAL DISCHARGE MACHINING APPARATUS
Kurt H. Sennowitz, Royal Oak, Mich.
(1830 Stephenson Highway, Troy, Mich. 48084)
Filed Jan. 22, 1968, Ser. No. 699,417
Int. Cl. B23k 9/16
U.S. Cl. 219—69
7 Claims

ABSTRACT OF THE DISCLOSURE

A servo control circuit for maintaining relatively constant gap spacing between a plurality of electrical discharge machining electrodes and one or more workpieces wherein the electrodes are all controlled in their movement by a common motive means. A separate power supply and a separate sensing network for each gap are isolated from each other by diodes, and the motive means is responsive to the lowest gap voltage of the several gaps.

BACKGROUND OF THE INVENTION

The field to which my invention relates is that field known as electrical discharge machining hereinafter sometimes referred to as EDM in which material is removed from an electrically conductive workpiece by the action of electrical gap discharges between one or more tool electrodes and the workpiece. An electrode or workpiece servo feed system is employed to maintain an optimum gap spacing between electrode and workpiece as metal removal progresses. A dielectric coolant such as kerosene or transformer oil is circulated continuously through the gap during machining operation. In making large cavity dies by the electrical discharge method, it is sometimes necessary to employ a plurality of electrodes, each with a separate power supply. In some set-ups, the several electrodes are mounted side by side and insulated one from the other with a common motive means provided to move them towards and away from the workpiece as gap condition dictates. A similar servo feed situation exists when a number of cavities or through holes are being machined in a common workpiece by plurality of electrodes which likewise are operated by a common motive means to maintain required gap spacing between them and the workpiece. These multiple electrode machining set-ups are shown and described in Matulaitis U.S. Patent No. 2,783,411 issued on Feb. 26, 1957 entitled "Servo Feed for Multiple Electrodes." My invention relates to a control circuit which properly monitors the advancement and retraction of the electrodes in such a split or parallel machining set-up as I have just described.

SUMMARY OF THE INVENTION

My invention wlil be seen to provide an improved servo feed control circuit for split or parallel cutting operation for a plurality of power supplies and electrodes wherein these electrodes are controlled in their movement by a common operator power feed means. My circuit employs a plurality of sensing networks, one for each power supply and electrode used. The circuit further employs a differential amplifier with two transistors controlled in their conductivity by a reference signal supplied to the control electrode of one and by a control signal derived from a plurality of sensing networks applied to the control electrode of the other. The control signal is itself dependent on the lowest gap voltage of the several gaps.

DESCRIPTION OF THE DRAWINGS

The figure of the drawing is a schematic circuit diagram.

DESCRIPTION OF THE CIRCUIT

The electrical discharge machining power circuit includes power supplies 12 and 12a, each connected across its own machining gap comprising workpiece 14 and electrodes 16 and 16a. A pair of transistors 18 and 18a are connected between power supply 12 and 12a, respectively, and their respective gaps to provide machining power pulses thereacross responsive to the periodic operation of transistors 18 and 18a. These transistors are turned on and off over a broad range of frequencies with a wide range of on-off time ratios selected in accordance with the type of machining operation being carried out. Transistors 18 and 18a each have provided to their bases the proper triggering signals for turning them on and off to generate the machining power pulses just referred to. These triggering pulses may be generated, for example, by a multivibrator or by any of a number of pulsing means known to the electronic art.

While my invention indicates that the polarity used is that of negative electrode and positive workpiece, this polarity may be reversed as required by the type of operation performed and according to the workpiece-electrode material combination used. My servo control circuit has its reference voltage derived from a resistance network connected in parallel with the DC source. This network includes fixed resistors 26, 28 connected in series with the variable resistor of potentiometer 30. Filter capacitor 32 is connected as shown. An input signal is provided through two sensing networks, each connected across a different one of the two gaps shown. The sensing networks include a series diode-capacitor network connected across each of the two gaps. Diode 23, capacitor 25 are connected across the upper gap while diode 23a, capacitor 25a are connected across the lower gap. A parallel and a shunt resistor are coupled to each of the aforementioned gaps. In the upper gap, resistors 27, 29 are connected as shown. In the lower gap, resistors 27a, 29a complete the sensing circuit. Each of these sensing networks is coupled to the negative terminal of an auxiliary voltage source 31 through diodes 33, 33a as indicated. A common junction of the two capacitors 25, 25a is coupled through resistor 35 to the positive terminal of the auxilary voltage source 31.

The direction of electrode movement is controlled by the direction of current flow through an electrically energized element, in this case, an electro-magnetic servo valve coil 44 connected between the collectors of transistors 46 and 48. Full details of the servo motor and valve are not shown here in the interest of simplifying the disclosure. However, a number of suitable electro-hydraulic EDM servo control systems are shown in the Webb U.S. Patent No. 3,230,421 issued on Jan. 18, 1966 entitled "Servo Feed Apparatus for Electrical Discharge Machining." Diodes 50 are connected across the base-emitter junction of transistor 46 to protect it from excess turn-off voltage. Similarly, diodes 52 are connected across the base-emitter junction of transistor 48. In each case, a transistor amplifier stage 47, 49 is connected to give proper signal level for operating the servo control coil 44. Potentiometer 54 has its variable resistor connected between the collector of transistor 48 and the parallel RC network including resistors 56, 58 and capacitor 60 to provide for adjustment of sensitivity. A pair of parallel RC networks are selectively connectible in series to coil 44 by the operation of switch 62. The lower RC network comprising resistor 64 and capacitor 66 is connected in the circuit during normal operation. The second upper RC network of different time constant is shown with resistors 68, 70 and capacitor 72. This second network is connectible in the circuit during high frequency finishing operation to slow down the servo system. Current limiting resistors 74, 76 are suitably provided in the circuit in series with the respective bases of transistors 47 and 49. Load resistors 78 and 80 are connected between the respective collectors of transistors 46 and 48 and the negative voltage terminal of DC source 10 while resistor 82 is coupled between the positive terminal of DC source 10 and the emitters of transistors 46, 48.

DESCRIPTION OF OPERATION

When the power supplies and multivibrators are turned on, triggering pulses are applied to the upper and lower gaps by operation of switches 18 and 18a. Capacitors 25 and 25a are rapidly charged to a negative voltage from auxiliary supply 31 through diodes 33 and 33a, respectively. In the preferred embodiment of my invention, the three power supplies 12, 12a and 31 are all of substantially equal voltage. Capacitors 25 and 25a are prevented from discharging into the gap through shunt resistors 29 and 29a on gap open circuit. Series resistors 27, 27a and diodes 23, 23a help to charge capacitors 25, 25a to the proper polarity.

In the beginning of the cycle, capacitors 25, 25a are charged to approximately the voltage of auxiliary supply 31. This turns on transistor 47 through drive limiting resistor 74 to also turn on transistor 46 and provide servo downfeed. Electron flow then occurs from the negative terminal of source 10 through resistor 78, the collector-emitter junction of transistor 46 and resistor 82 back to the positive terminal of DC source 10. At the same time, electron flow occurs down through resistor 80, potentiometer 54, resistor 56, in a leftward or in-feed direction through coil 44, through resistor 64 and through transistor 46. This electron flow in a leftward direction through coil 44 causes both the electrodes 16, 16a to be advanced toward workpiece 14. During a gap short circuit condition, for example, in the upper gap, capacitor 25 will discharge through resistors 29 and 27 to connect the auxiliary voltage source 31 negative voltage to the positive gap terminal. Transistor 47 will be turned off by a plug signal to its base and transistor 46 will be rendered non-conductive. Transistors 48, 49 will be turned on from the negative reference voltage stored on capacitor 32 and electron flow through servo coil 44 will be in a rightward direction to provide back-up of electrodes 16, 16a form workpiece 14. The function of resistor 35 in series between auxiliary supply 31 and the positive gap terminal is to limit current flow from that supply and the charging of capacitor 25. It will thus be seen that the circuit will immediately sense the lowest voltage gap and rapidly respond to provide a rapid back-up during a shorted arc.

A feature of further importance is that of the two RC networks in series with control coil 44. The networks referred to are those including resistor 64, capacitor 66 and resistors 56, 58, capacitor 60. During normal cutting, the hydraulic control coil 44 will pass current in one direction only and hold the gap spacing constant according to the reference setting made on potentiometer 30. If the gap should short circuit, capacitors 66 and 60 will discharge rapidly and provide fast ram back-up for perhaps 0.01 to 0.10 inch. This assists greatly in cutting away particles which may have accumulated in or adhered to the gap elements and in breaking up the short circuit condition. Capacitors 66 and 60 will then become charged to the opposite direction and provide a fast servo downfeed again for about 0.01 to 0.10 inch immediately after the short circuit condition is relieve. This provides highly effective pulsing of the gap during up or down feed and particularly improves deep hole cutting thus clearing the shorted gap more quickly and preventing the electrode from backing out all the way.

My circuit has the further advantage of being readily converted from that polarity shown to the opposite gap polarity when this is desired. It is only necessary to reverse the polarity of diodes 23, 23a and 33, 33a and to connect auxiliary supply 31 to suit the opposite polarity.

I claim:

1. In an electrical discharge machining apparatus including a plurality of tool electrodes, an electrically operated reversible power feed means operable to advance said electrodes toward a common workpiece at the same time and a separate power pulse source for each of said eelctrodes, a servo feed control circuit for said electrodes including an auxiliary power source, wherein the improvement comprises a separate sensing network connected between each of said electrodes and said workpieces, each of said first networks comprising a series connected diode and capacitor, each of said capacitors having one terminal connected to one terminal of said auxiliary power source and its other terminal connected through a second diode to the other terminal of said auxiliary power source to provide a control output signal for said power feed means.

2. The combination as set forth in claim 1 wherein a different resistor is connected in series with each of said first diodes and a different resistor is connected in shunt with each of said first diodes.

3. The combination as set forth in claim 1 wherein said auxiliary power source is of a magnitude substantially equal to each of said separate power sources.

4. In an electrical discharge machining apparatus including a plurality of eelctrodes, an electrically operated reversible power feed means operable to advance said electrodes toward a common workpiece at the same time and a separate power source for each of said electrodes, a servo feed control circuit for said electrodes including an auxiliary power source, wherein the improvement comprises a separate sensing network connected between each of said electrodes and said workpiece, each of said first networks comprising a series connected diode and capacitor, each of said capacitors having one terminal connected to one terminal of said auxiliary power source and its other terminal connected through a second diode to the other terminal of said auxiliary power source, a reference voltage source, an electrically energized element operatively connected to and controlling the operation of said power feed means responsive to direction of current flow through said eelment, said element operatively connected between said second mentioned terminal of said auxiliary power source and said reference voltage source.

5. The combination as set forth in claim 4 wherein a differential amplifier is operatively connected to said element and between said auxiliary power source and said reference voltage source for controlling the operation of said element and thereby controlling said power feed means.

6. The combination as set forth in claim 5 wherein said differential amplifier comprises a pair of like polarity transistors, each having a like power electrode coupled to a different terminal of said element to provide current flow therethrough in opposing directions, one of said transistors having its control electrode connected to said second mentioned terminal of said auxiliary power source and the other of said transistors having its control electrode connected to said reference voltage source.

7. In an electrical discharge machining apparatus for machining an electrically conductive workpiece by electrical discharges across a dielectric coolant filled gap between a tool electrode and the workpiece, a servo feed means for controlling the gap spacing comprising a motive means for providing relative movement between said electrode and workpiece, an electrically energized element for controlling the operation of said motive means responsive to the direction of current flow through said element, means for sensing an electrical parameter of the gap and providing a signal voltage source representative thereof, a reference voltage source, and a pair of parallel resistor-capacitor networks, each connected in series between one of said voltage sources and a different terminal of said element to provide initial fast operation of said motive means responsive to change of current flow direction through said element.

References Cited

UNITED STATES PATENTS 2,783,411  2/1957  Matulaitis.
3,230,412  1/1966  Webb.
3,287,537  11/1966  Chenel et al.

ANTONY BARTIS, Primary Examiner

R. F. STAVBLY, Assistant Examiner

U.S. Cl. X.R.

204—143